C. F. DUNDERDALE.
APPARATUS FOR THE MANUFACTURE OF OZONE.
No. 109,601.                    Patented Nov. 29, 1870.
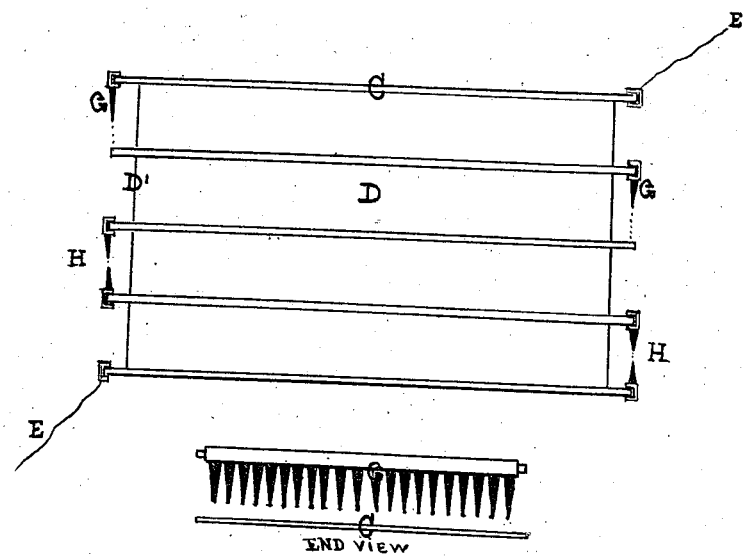
WITNESSES                              INVENTOR

United States Patent Office.

CLEAVELAND F. DUNDERDALE, OF NEW YORK, N. Y.

Letters Patent No. 109,601, dated November 29, 1870.

IMPROVEMENT IN APPARATUS FOR THE MANUFACTURE OF OZONE.

*The Schedule referred to in these Letters Patent and making part of the same.*

I, CLEAVELAND F. DUNDERDALE, of the city, county, and State of New York, having invented a certain Apparatus for Generating Ozone, for which Letters Patent were granted me on the 15th day of March, 1870, have made certain further improvements thereon and connected therewith, of which the following is a specification.

This part of my invention relates to the placing between the tubes or plates of the apparatus aforementioned as patented to me, of finely-divided conductors of suitable material, to cause the current of electricity or its equivalent, passing between the plates of said apparatus, to pass from plate to plate or tube to tube, in as finely divided a state as possible, so that the current of air or gas passing through said apparatus between its plates or tubes will have to pass through a fine rain of the electric fluid, so that every particle of said air or gas so passing through or between said plates or tubes may be brought in contact with or acted upon by the current or currents of electricity or its equivalent so passing through or between said tubes or plates. This is accomplished by attaching to the ends of each tube or plate a series of fine points, wires or needles of metal or other suitable material or their equivalents, so that each of said points, wires, or needles or their equivalents, are in contact with the conducting material of which such plate or tube is composed, and pointing down toward the next alternate plate to guide the flow of the electric or magnetic current in that direction; or each plate or tube may have a series of such points or conductors attached thereto, pointing directly toward each of their opposite series, so that the current may pass from point to point in its regular passage through all of the plates or tubes in said apparatus instead of passing from point to plate, if found desirable.

C being the plates, when used instead of tubes, of metal or glass coated with a metal or other conducting material;

D', the pieces of glass or other suitable material for insulating each plate; and D, the interstices or passages for the air or gas between each plate.

G represents the fine points of metal or their equivalents, on the end of each plate, when placed on one plate, that the electric fluid may pass from point to plate.

H, the points when placed on both plates opposite their own series, so that the electric fluid may pass from point to point on its way from plate to plate through the apparatus. The wires E being connected with the opposite terminals of an electric, magnetic, or galvanic-battery, and the current turned on, the fluid passes along the first plate, and thence through the fine points in a number of finely-divided streams to the second plate, along which it passes until it reaches its end; thence down the fine points or wires to the next plate, and so on until it passes along each plate contained in the apparatus, until it passes off through the opposite terminal back to the battery.

The air or gas passing through or between these plates has to pass through these finely-divided streams of electricity so passing from plate to plate, and is thus brought in complete contact therewith and thoroughly acted upon.

I claim as my invention—

In combination with the apparatus specified in the Letters Patent granted to me March 15, A. D. 1870, No. 100,736, or its equivalent, the use of points of suitable conducting material, wires, needles, or their equivalents, placed between the tubes or plates thereof, operating as and for the purpose as herein specified and described.

2. The passing of atmospheric air or oxygen through finely-divided streams or currents of electricity or magnetic fluids, for the purpose of converting the oxygen thereof into ozone.

3. The plates C, points or their equivalents G, the insulators D', the spaces, insterstices, or passages D, or their equivalents, with battery terminals E, combined and arranged substantially as herein specified and described, and for the purpose set forth.

CLEAVELAND F. DUNDERDALE.

Witnesses:
JOHN ERSKINE,
J. S. WATSON.